(12) United States Patent
Rouillard et al.

(10) Patent No.: US 6,367,487 B1
(45) Date of Patent: *Apr. 9, 2002

(54) ANTI-ETCH AND CLEANING COMPOSITION FOR GLASS BOTTLES

(75) Inventors: Carol Anne Rouillard, Loveland; Charles Allen Crawford, Maineville; David Cole; Michael Howell, both of Cincinnati, all of OH (US)

(73) Assignee: Diversey Lever, Inc., Plymouth, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 09/372,534

(22) Filed: Aug. 11, 1999

(51) Int. Cl.[7] .......................... C03C 23/00; C11D 3/37; C11D 3/02; C11D 7/06
(52) U.S. Cl. ............... 134/25.2; 134/3; 510/179; 510/219; 510/223; 510/225; 510/227; 510/229; 510/398; 510/434; 510/435; 510/477; 510/488; 510/533
(58) Field of Search ................. 510/179, 219, 510/223, 225, 227, 229, 398, 434, 435, 477, 488, 533; 134/3, 25.2

(56) References Cited

U.S. PATENT DOCUMENTS

| | | | |
|---|---|---|---|
| 4,713,195 A | * 12/1987 | Schneider | 252/180 |
| 5,019,290 A | * 5/1991 | Bruegge et al. | 252/135 |
| 5,084,198 A | 1/1992 | Ahmed et al. | 252/99 |
| 5,622,569 A | 4/1997 | Dennis et al. | 134/2 |
| 5,849,095 A | * 12/1998 | Rouillard | 134/3 |

FOREIGN PATENT DOCUMENTS

| | | |
|---|---|---|
| EP | 0 774 506 A | 5/1997 |
| EP | WO 01/12769 A1 * | 2/2001 |
| GB | 965 215 A | 7/1964 |
| JP | 08 176589 | 7/1996 |
| WO | 96/16159 | 5/1996 |
| WO | 97/38079 | 10/1997 |

OTHER PUBLICATIONS

International Search Report dated Nov. 2, 2000.

* cited by examiner

Primary Examiner—Mark Kopec
Assistant Examiner—Brian P. Mruk
(74) Attorney, Agent, or Firm—Edward A. Squillante, Jr.

(57) ABSTRACT

A novel anti-etch and cleaning solution is described. The solution comprises a hetero functionalized polymer, caustic and optionally, an anti-etch component and unexpectedly results in glassware that is substantially free of contaminants and etching after washing.

17 Claims, No Drawings

ANTI-ETCH AND CLEANING COMPOSITION FOR GLASS BOTTLES

FIELD OF THE INVENTION

This invention is directed to a novel cleaning composition for glassware. More particularly, the invention is directed to an anti-etch and cleaning composition that unexpectedly results in bottles that are substantially free of etching and contaminants after washing.

BACKGROUND OF THE INVENTION

Glassware, like domestic dishes and glass bottles used in the soft drink and alcoholic beverage industries, is frequently rewashed, recycled and/or reused. With respect to glass bottles, for example, such a recycling process is extremely advantageous since it reduces the amount of glassware that, for instance, pollutes local neighborhoods and results in non-biodegradable debris in local landfills. Also, the recycling of bottles enables the beverage industry to save money by getting more uses out of the bottles it has invested in.

When recycling glassware, it is imperative that the glassware be washed to the point of being commercially sterile. Obtaining commercially sterile bottles, for example, from bottles that have been previously used, is not easy since used bottles are often contaminated with dirt, mold, sugar, food coloring, product labels, glue and the like. In order to remove such contaminants from the bottles being cleaned, harsh environments, such as those which employ relatively long contact times, high temperatures, chelators (e.g., ethylene diamine tetraacetic acid [EDTA] and nitrilotriacetic acid [NTA]) and caustic, are used. Such environments typically are successful in "transforming" glassware that was once used into glassware that is substantially free of contaminants and commercially sterile.

Unfortunately, however, when bottles are subjected to harsh environments, like those that employ EDTA and NTA, the bottles begin to literally dissolve in the presence of the strong chelators. The dissolution of the glass gives the bottles a scratchy look, making the bottles aesthetically unappealing for consumer use. Moreover, glass dissolution results in free silica in cleaning environments. Free silica often creates problems in equipment used to clean glassware, since free silica often complexes with other materials and deposits as a silica scale on the equipment used for cleaning the glassware.

Other attempts have been made for cleaning glassware with compositions that do not employ harsh chelating agents like EDTA and NTA. These compositions typically use metal ions (e.g., zinc, beryllium); however, such compositions often do not display superior cleaning capabilities and can pose health, environmental and equipment problems.

It is of increasing interest to formulate a composition that results in glassware that is not etched, and contaminant free after washing. This invention, therefore, is directed to a superior anti-etch and cleaning composition that unexpectedly results in glassware, like bottles, that is substantially free of etching and contaminants after washing. Substantially free of contaminants is defined to mean glassware that is about as clean as glassware cleaned with conventional washing solutions, (having strong chelators like EDTA), as analyzed by the Examples which follow.

BACKGROUND REFERENCES

Efforts have been disclosed for cleaning glassware. In U.S. Pat. No. 5,849,095, anti-etch bottle washing solutions are made, and the solutions do not contain a phosphorus comprising polymer.

Other efforts have been disclosed for making cleaning compositions. In U.S. Pat. No. 5,622,569, a cleaning composition comprising sodium carbonate, sodium hydroxide and sodium gluconate is described.

Still further, other attempts for making cleaning compositions have been disclosed. In U.S. Pat. No. 5,084,198, thixotropic liquid dishwashing detergents that result in improved filming and spotting are described.

SUMMARY OF THE INVENTION

In a first embodiment, the present invention is directed to an anti-etch and cleaning composition comprising:

a) at least one polymer selected from the group consisting of a hetero functionalized polymer comprising a carboxylic acid group and a hetero functionalized polycarboxylate; and b) caustic.

In a second embodiment, the present invention is directed to an anti-etch and cleaning composition comprising:

a) at least one polymer selected from the group consisting of a hetero functionalized polymer comprising a carboxylic acid group and a hetero functionalized polycarboxylate;

b) caustic; and c) an anti-etch component.

In a third embodiment, the present invention is directed to glassware that has been subjected to the to the anti-etch and cleaning composition described in the first embodiment of this invention.

DETAILED DESCRIPTION OF THE PREFERRED EMBODIMENTS

There generally is no limitation with respect to the type of hetero functionalized polymer comprising a carboxylic acid group that may be used in this invention other than that the polymer results in an anti-etch and cleaning composition that renders dirty glassware substantially free of etching and contaminants after washing. Such polymers typically comprise backbones that are derived from polypeptides, polyolefins, polyesters and polyethers, including homopolymers and copolymers (including terpolymers) prepared therefrom. The polymers also comprise carboxylic acid groups that are, for example, substituted on to the precursor monomeric units used to make each polymer.

There generally is no limitation with respect to the hetero functionalized polycarboxylate polymer used in this invention, other than that the polymer results in an anti-etch and cleaning composition that renders dirty glassware substantially free of etching and contaminants after washing. The preferred polycarboxylate polymers include those having hetero groups as grafts, terminating groups or both. The most preferred polycarboxylate polymers used in this invention are phosphino carboxylic acids and phosphono carboxylic acids having sulfonate groups, both of which are commercially available from FMC Corporation and sold under the names of Belclene 750 and Belclene 745, respectively. Other most preferred hetero functionalized polycarboxylate polymers which may be used in this invention include polymers having a portion derived from diacids. The most preferred diacid derived hetero functionalized polycarboxylate polymer used in this invention is one derived from the copolymerization of maleic acid, an alkyl acrylate (such as a C1–C4 alkyl acrylate) and a vinyl acetate. Such a terpolymer is commercially available from FMC Corporation and sold under the name of Belclene 730.

There generally is no limitation with respect to the hetero groups used to functionalize the polymers which may be used in this invention other than that the hetero groups enhance the solubility, chelating effect or both of the polymer. The preferred hetero groups are those comprising elements having a valence number of 5 or 6, with phosphino, phosphono and sulfonate groups being the most preferred hetero groups.

As to the hetero groups employed in this invention, such groups typically make up from about 0.1% to about 5.0%, and preferably, from about 0.15% to about 3.0%, and most preferably, from about 0.5% to about 1.5% by weight of the total weight of the hetero functionalized polymer comprising a carboxylic acid group or the hetero functionalized polycarboxylate, including all ranges subsumed herein. The primary factor with respect to determining the molecular weight of the hetero functionalized polymer used in this invention is the ability of the polymer to result in an anti-etch and cleaning composition able to achieve the desired results of this invention. Generally, however, the polymers have a weight average molecular weight ranging from about 500 to about 125,000.

When formulating the anti-etch and cleaning composition of this invention, there is no limitation with respect to the amount of hetero functionalized polymer used other than that the amount used results in a composition capable of achieving the desired results of this invention. Typically, the anti-etch and cleaning composition of this invention will have enough hetero functionalized polymer to produce an in use solution comprising from about 5 to about 5000, and preferably, from about 25 to about 3000, and most preferably, from about 250 to about 1200ppm hetero functionalized polymer. As used herein, in use solution is defined to mean the overall cleaning solution used in a conventional bottle cleaning system.

As to the caustic employed in this invention, there is no limitation with respect to the caustic employed as long as the caustic selected is one which results in an anti-etch and cleaning composition capable of achieving the desired results of this invention. Typically, however, the caustic employed is a Group IA or IIA hydroxide, ammonium hydroxide, or a mixture thereof. The preferred caustic is a hydroxide of sodium or potassium, with sodium hydroxide being the most preferred.

The amount of caustic employed is limited only to the extent that an anti-etch and cleaning composition may be formulated. Typically, the amount of caustic used is enough to result in an in use solution comprising from about 0.25% to about 20.0%, and preferably, from about 0.5% to about 15.0%, and most preferably, from about 1.0% to about 7.5% by weight caustic.

Regarding the anti-etch component used in the anti-etch and cleaning composition of this invention, such a component is preferred but optional and limited only to the extent that it may be used to prepare the desired composition of this invention. Typically, however, the anti-etch component employed in this invention is one comprising at least one carboxylic acid group. The preferred anti-etch component used in this invention is a polycarboxylic acid, (without a hetero group), and the most preferred anti-etch component is a polyacrylate, like a Group IA or IIA polyacrylate, with a sodium polyacrylate (e.g., Alcosperse 408, weight average molecular weight of about 3000, an anionic terpolymer made commercially available by Alco) being especially preferred.

The amount of anti-etch component employed in the anti-etch and cleaning composition of this invention is typically enough to result in an in use solution comprising from about 1.0 to about 1000, and preferably, from about 20.0 to about 500.0 and most preferably, from about 50.0 to about 150 ppm of the anti-etch component.

It is also within the scope of this invention to use conventional additives in the anti-etch and cleaning composition. Such additives include crystal growth inhibitors, like Acusol 505N or Acusol 479N, copolymers made commercially available from Rohm & Haas. Other additives include buffers, like sodium bicarbonate, sodium carbonate, sodium phosphate, sodium disilicate and mixtures thereof. Still further, other additives which may be employed in this invention include phosphonates (acids and salts) such as aminotri (methylene-phosphonic acid) and aminotri (methylene-phosphonic acid), pentasodium salt, both of which are sold under the name of DEQUEST 2000 and DEQUEST 2006, respectively and made commercially available by Solutia.

The amount of phosphonate that may be employed in the invention is often enough to produce an in use solution comprising from about 1 to about 2000, and preferably, from about 5 to about 1500, and most preferably, from about 50 to about 1100 ppm phosphonate.

Agents like gluconic acid and water soluble salts thereof may also be used in this invention to enhance the chelating action of the composition of this invention. Other agents that enhance the chelating action of the composition of this invention include an alkali metal glucoheptonate, alkali metal boroheptonate and mixtures thereof. Such agents that enhance chelating action typically result in an in use solution having from about 200 to about 2000 ppm chelating agent.

Still other additives which may be used in the anti-etch and cleaning composition of this invention include surfactants (e.g., anionic, nonionic and/or amphoteric). The nonionics may generally be classified as polyalkylglycosides. A preferred polyalkylgycoside is Glucopon 425CS, which is commercially available from Henkel Care Chemicals. Examples of other surfactants which may be used in this invention include sodium salts of carboxylated linear alcoholalkoxylates, lauryl sulfate, sodium xylene sulfonate, toluene sulfonic acid and salts thereof, sulfosuccinate salts, fatty acids and their salts, anionic glucoesters such as disodium cocoglucoside citrate, disodium cocoglucoside sulfosuccinate and sodim cocopolyglucose tartrate, iminodipropionates such as disodium tallow iminodipropionate, as well as disodium cocamphodiacetate and cocoamphocarboxylacinate, as well as disodium cocoamphodiacetate and cocoamphocarboxylacinate, and the imidazolines. It should be further noted that water may be added as the balance to the anti-etch and cleaning composition of this invention, if desired. A more detailed description of the additives which may be used in this invention may be found in U.S. Pat. 5,849,095, the disclosure of which is incorporated herein by reference.

As to the glassware which is subjected to the anti-etch and cleaning composition of this invention, such glassware is not limited and includes bottles from the soft drink and alcoholic beverage industries. Subjected to, as used herein, is defined to mean glassware that has been cleaned with the anti-etch and cleaning composition of this invention, whereby the cleaning takes place in conventional bottle washers.

The examples that follow are provided to illustrate and facilitate an understanding of the present invention. The examples are not intended to restrict the scope of this invention.

EXAMPLE 1

Standard soft drink bottle soil was made according to the guidelines set forth by the Society of Soft Drink Technologists. The soil was made, in the form of a slurry, by charging a mixing vessel with the following components:

- 150 grams Redart red clay, 100 mesh or finer (Cedar Heights Clay Company, Oak Hill, Ohio)
- 22.5 grams Durham Water Putty (Aanold Durham Co., Des Moines, Iowa)
- 6.0 grams Xantham Gum
- 4.5 grams Malt Extract (Difco Laboratories Inc., Detroit, Mich.)
- 4.5 grams Yeast Extract (Difco Laboratories Inc., Detroit Mich.)
- 7.5 grams Peptone (Difco Laboratories Inc., Detroit Mich.)
- 15.0 grams Dextrose (Difco Laboratories Inc., Detroit Mich.)
- 1500 ML deionized water.

The components were mixed, and the resulting homogeneous slurry was used as the soft drink bottle soil in the examples which follow.

EXAMPLES 2–6

Six 1L volumetric flasks were each charged with 60 grams of aqueous sodium hydroxide (50% NaOH), 5 grams sodium carbonate and 1000 mL of deionized water. The flasks were also charged as follows:

| Flask No. | Additional Components |
|---|---|
| 1 | No additional components |
| 2 | 0.5 g sodum tripolyphosphate |
| 3 | 2.0 g of commercially available bottle cleaning composition* |
| 4 | 1.0 g Belclene 745 (0.5 g active) + 0.1 g Alcosperse 408 |
| 5 | 1.0 g Belclene 750 (0.5 g active) + 0.1 g Alcosperse 408 |

*Conventional and commercially available bottle cleaning composition, comprising about 80% raw EDTA (about 39% active) and about 5.0% sodium gluconate (percents by weight).

EXAMPLES 7–11

Five groups of six about 1"×3" washed glass slides were weighed. Exactly 1.0 gram of the soil produced in Example 1 was applied to one side of each glass slide. The soil was uniformly applied with a policeman to about a two inch portion of each glass slide. The soiled slides (soil up) were placed on a rack (under hood) and allowed to dry overnight at room temperature. After about 12 hours of drying at room temperature, the slides were dried in an oven set at about 70° C. for about 3 hours. The resulting five sets of slides were prepared to mimic used/dirty bottles found in many beverage industries.

EXAMPLE 12

The five solutions prepared in Examples 2 thru 6 (corresponding to flask Nos. 1–5) were each transferred independently, to a stainless steel can of a commercially available Terg-o-tometer (commercially available from United States Testing Co., Inc.). The solutions were heated to about 70° C. The glass slides prepared in Examples 7–11 were clipped to rings (6 slides per ring with soil facing inward). Each ring was lowered into a stainless steel can of the Terg-o-tometer, whereby each can had one of the solutions prepared in Examples 2–6. The rings were lowered into each can to the point where the soiled portion of each slide was completely submerged in solution. Once submerged in the solutions, each set of slides was subjected to agitation (about 25 rpm for about 5 minutes and 40 rpm for 25 minutes). At the end of the 30 minute period, the rings and slides were removed and the slides were rinsed (dipped) into deionized water. The washed slides were removed from the rings and each group of six slides was oven dried for about 1 hour at about 50° C. The slides were removed from the oven and allowed to cool. Each set of six slides was again weighed. The weight of the slide sets, after being subjected to solution and deionized water, was subtracted from the original weight of the slide set plus the dried soil. The weight difference calculated is set forth in Table 1 below. Each weight difference corresponds to the percent soil removed.

TABLE 1

| Solution No. (from corresponding flasks) | Percent Soil Removal |
|---|---|
| 1 | 39 |
| 2 | 37 |
| 3 | 58 |
| 4 | 56 |
| 5 | 58 |

EXAMPLE 13

Five sets of three slides, identical to those used in the Examples above, except that the slides were not soiled, were weighed. Each set of glass slides was placed in a sealed, stainless steel vessel charged with one of the solutions described in Examples 2 thru 6. The glass slides were submerged in the solutions (maintained at about 70° C.) for about 72 hours. After the 72 hour period, the slides were hand washed with a commercially available dishwashing detergent, rinsed with deionized) water, submerged in an acidic bath (7.5% phosphoric acid) for about 20 minutes, rinsed again with deionized water, dried and, again, weighed. The data in Table II, represents the weight difference of each set of slides. The weight difference was calculated by subtracting the weight of each set after being submerged in the solutions from the original weight of the set. The weight difference depicts how much the slides etched (how much silica dissolution) in each solution whereby the weight difference is depicted as percent etching.

TABLE II

| Solution (from corresponding flasks) | Percent Etching |
|---|---|
| 1 | 1.37 |
| 2 | 0.85 |
| 3 | 2.32 |
| 4 | 0.02 |
| 5 | 0.03 |

What maybe understood from the data above, the superior anti-etching and cleaning solution of this invention (e,g., solutions 5 and 6) unexpectedly result in glass that is, simultaneously, free of contaminants and etching after washing. Furthermore, the unexpected results obtained in this invention are achieved without requiring strong chelators, like EDTA and NTA, in the composition.

What is claimed:

1. An anti-etch and cleaning composition comprising:
   (a) at least one polymer selected from the group consisting of a hetero functionalized polymer comprising a carboxylic acid group and a hetero functionalized polycarboxylate polymer; and
   (b) caustic
   wherein hetero is a group with a valence of 5 or 6.

2. The anti-etch and cleaning composition according to claim 1 wherein the hetero functionalized polymer comprising a carboxylic acid group is a polymer comprising a polypeptide, polyolefin, polyester or polyether backbone.

3. The anti-etch and cleaning composition according to claim 1 wherein the hetero functionalized polycarboxylate is derived from a diacid.

4. The anti-etch and cleaning composition according to claim 1 wherein the hetero functionalized polycarboxylate is derived from maleic acid, a $C_{1-4}$ alkyl acrylate and vinyl acetate.

5. The anti-etch and cleaning composition according to claim 1 wherein the hetero group is a phosphino, phosphono or sulfonate group.

6. The anti-etch and cleaning composition according to claim 1 wherein the hetero functionalized polycarboxylate comprises a phosphono and sulfonate group.

7. The anti-etch and cleaning composition according to claim 1 wherein the hetero functionalized polymer comprising a carboxylic acid group and the hetero functionalized polycarboxylate comprise from about 0.1% to about 5.0% by weight hetero group.

8. The anti-etch and cleaning composition according to claim 1 wherein the caustic comprised at least on member selected from the group consisting of a Group IA or IIA hydroxide and ammonium hydroxide.

9. The anti-etch and cleaning composition according to claim 8 wherein the caustic is a Group IA hydroxide, and the Group IA hydroxide is sodium hydroxide.

10. The anti-etch and cleaning composition according to claim 1 wherein the composition further comprises an anti-etching component.

11. The anti-etch and cleaning composition according to claim 10 wherein the anti-etching component comprises a carboxylic acid group.

12. The anti-etch and cleaning composition according to claim 11 wherein the anti-etching component comprising a carboxylic acid group is a group IA or IIA polyacrylate.

13. Glassware having been contacted with an anti-etch and cleaning composition comprising:
    a) at least one polymer selected from the group consisting of a hetero functionalized polymer comprising a carboxylic acid group and a hetero functionalized polycarboxylate; and
    b) caustic.

14. The glassware according to claim 13 wherein the glassware is a soft drink or alcoholic beverage bottle.

15. The glassware according to claim 13 wherein the anti-etch and cleaning composition further comprises an anti-etching component.

16. A method for cleaning glassware comprising the steps of:
    (a) contacting glassware with a composition comprising:
       (i) at least one polymer selected from the group consisting of a hetero functionalized polymer comprising a carboxylic acid group and a hetero functionalized polycarboxylate polymer; and
       (ii) caustic
    (b) removing the glassware from the composition
    wherein hetero is a group with a valence of 5 or 6 and the glassware is substantially free of etching after cleaning.

17. The method for cleaning glassware according to claim 16 wherein the glassware is a bottle.

* * * * *